United States Patent [19]

Heller et al.

[11] 3,821,437

[45] June 28, 1974

[54] METHOD FOR THE PREVENTION OF PHOTODISCOLORATION OF RED MEAT

[75] Inventors: Adam Heller, Sharon, Mass.; Kirby N. Klump, Pittsburgh, Pa.

[73] Assignee: GTE Laboratories Incorporated, Waltham, Mass.

[22] Filed: Nov. 13, 1972

[21] Appl. No.: 305,992

[52] U.S. Cl. ............................................. 426/265
[51] Int. Cl. ............................................. A23b 1/00
[58] Field of Search ............ 99/107, 108, 157, 159, 99/194, 208, 148, 148 C; 426/177, 212, 250, 264, 265, 167, 224

[56] References Cited
UNITED STATES PATENTS

| | | | |
|---|---|---|---|
| 2,863,777 | 12/1958 | Dekker | 99/157 |
| 2,916,385 | 12/1959 | Bauernfeind | 99/148 C |
| 3,032,420 | 5/1962 | Ferrari | 99/107 |
| 3,597,236 | 8/1971 | Hopkins et al. | 99/157 |
| 3,600,200 | 8/1971 | Bernholdt et al. | 99/194 |

*Primary Examiner*—Hyman Lord
*Attorney, Agent, or Firm*—Irving M. Kriegsman

[57] ABSTRACT

A process for the preservation of the natural red color of meat wherein the surface of the red meat product is treated with a solution of beta-carotene. When red meat is so treated, it has been found that the discoloration of the natural red meat color is retarded.

1 Claim, No Drawings

METHOD FOR THE PREVENTION OF PHOTODISCOLORATION OF RED MEAT

FIELD OF THE INVENTION

This application relates to a process for the preservation of the natural color of red meat and, more particularly, relates to a process for the prevention of the photodiscoloration of red meat by treatment of the surface of the red meat products with beta-carotene.

BACKGROUND OF THE INVENTION

A substantial portion of red meat cuts that are sold at retail are sold in supermarkets where such red meat cuts are individually packaged for examination by the retail consumer. To enable the consumer to examine the particular cut, the meat is packaged, at least in part, in transparent film and stored, generally, under moderate refrigeration. The natural red color of the meat, however, is known to change to brown or to green when the meat cut is exposed to light in the presence of oxygen (air). Such a combination is inherently present in the freezer sections of all supermarkets where red meat cuts and products are held in freezer display cabinets at about 0°–3°C under lighting of about 50–150 fast-candles intensity. The purchaser of such a meat cut is, quite obviously, greatly influenced by the color appearance of the product and generally tends to associate any change from the natural red color with a certain lack of freshness. Consequently, the meat industry has made extensive efforts to stabilize the natural red color of red meat cuts.

The preservation of the natural red color has been accomplished, in the past, by the addition of sodium nitrite, or by the addition of sodium nitrate which slowly is reduced to sodium nitrite in the meat. It has recently been found, however, that sodium nitrite can have harmful effects on experimental animals and, accordingly, its removal from all meat products is currently under consideration by governmental agencies.

OBJECTS OF THE INVENTION

It is the primary object of the present invention to provide a method for the preservation of the natural red color of red meat.

It is a further object of the present invention to provide a method for the preservation of the natural red color of red meat wherein the red meat cut or product is treated with a naturally-occurring material.

A further object of the present invention is to provide a method for stabilizing the natural red color of red meat against light-induced photodiscoloration.

Still a further object of the present invention is to provide a color-stabilized red meat product wherein the color is stabilized by treating the red meat cut or product in accordance with the present invention.

These and still further object, features, and advantages of the present invention will become apparent upon consideration of the following detailed disclosure.

BRIEF SUMMARY OF THE INVENTION

These and still further objects of the present invention are achieved, in accordance therewith, by treating the surface of the red meat cut or product with a solution of beta-carotene. Beta-carotene belongs to the group of compounds known as the "A" vitamins which are essential components to the human diet. Beta-carotene is found in most plants, including carrots from which the compound derives its name, and is commercially available or obtainable from such natural sources according to techniques and procedures known in the art.

The concentration of the beta-carotene in the solution utilized to treat the red meat cut or product should be from about 3 to 3,000 mg/liter, generally from about 10 to about 500 mg/liter, and can be applied, for example, by brushing $1 \times 10^{116.4}$ to about 0.1 cc/cm$^2$, generally from about 0.001 to about 0.01 cc/cm$^2$ to the surface of the meat, whereby the light-induced photodiscoloration of the red meat is retarded. For example, when a beta-carotene solution having a concentration greater than 50 mg/liter is applied by brushing about 0.02 cc/cm$^2$ to the surface of the meat, it has been found that discoloration is retarded and that the natural red color of the meat is retained.

The process of the present invention is most applicable to the prevention of the discoloration of the natural red color in fresh red meat. It is also contemplated, however, that the present invention is applicable to the stabilization of the natural red color of frozen, ground, aged, cured or dehydrated red meat cuts, carcasses and products.

DESCRIPTION OF SPECIFIC EMBODIMENTS

The following examples are given to enable those skilled in this art to more clearly understand and practice the present invention. They should not be considered as a limitation upon the scope of the invention but merely as being illustrative and representative thereof.

EXAMPLES I–IV

Two pieces of round steak are cut into 15 strips about 1–1½ inches wide and divided into 5 groups of 3 each. The surfaces of two strips in each group are brushed with an edible oil solution containing beta-carotene in the following concentrations:

| | |
|---|---|
| Example I | – 10$^{-5}$ M |
| Example II | – 10$^{-4}$ M |
| Example III | – 10$^{-3}$ M |
| Example IV | – 10$^{-2}$ M |

The amount of material brushed on in each sample is about 10$^{-2}$ cc/sq. in. Each strip is placed in a separate polyethylene bag. One treated strip from each Example, plus an untreated strip, also in a polyethylene bag, is placed within an environmental chamber maintained at 2° C, and exposed to a light source made up of a bank of eight 80-Watt Sylvania "Cool White" Fluorescent lamps. One treated strip from each example, plus an untreated strip, also in a polyethylene bag, are further individually wrapped in black plastic and also placed within the environmental chamber. The third strip from each example, plus an untreated strip, are placed in individual polyethylene bags which are brushed on the top of the bag with an edible oil solution of beta-carotene, and placed in the environmental chamber.

The meat is irradiated for a total of 95¾ hours. The meat strips are removed from the bags, and wrappings in the case of the meat held in the dark, and examined. The meat strips held in the dark are clearly in the best condition with regard to color retention. The untreated meat strips and the treated meat strips of Example I are essentially alike and unsatisfactory. The treated meat strips of Examples II–IV are in good condition, although the color is not quite as good as the meat strips held in the dark. The color of the meat strips where the beta-carotene is applied directly to the surface of the meat is better than the corresponding strips where the beta-carotene solution, of like concentration, is instead applied to the surface of the bag. The results of this study do show, however, that when the surface of the meat strips is treated with a $10^{-2}$ or $10^{-3}$ or $10^{-4}$ M solution of beta-carotene, light induced photodiscoloration is retarded, and the meat retains its natural red meat color for a longer period of time than do corresponding meat strips which are not so treated.

While the present invention has been described with reference to specific embodiments thereof, it will be understood by those skilled in this art that various changes may be made without departing from the true spirit and scope of the invention. In addition, modifications may be made to adapt a particular situation, material, need, procedural step, or then-present objective, to the spirit of the present invention without departing from its essential teachings.

What is claimed is:

1. A method for preserving the natural red color of red meat comprising treating the surface of a cut of red meat or a red meat product with a solution containing about 3 to about 3,000 mg/liter of beta-carotene to apply about $1 \times 10^{-4}$ to about 0.1 cc/cm$^2$ of beta-carotene to the surface of said red meat cut or said red meat product, the beta-carotene retained by said cut of red meat or said red meat product being in a sufficient amount to prevent or retard the light-induced photodiscoloration of said cut of red meat or said red meat product to thereby preserve the natural red meat color thereof.

* * * * *